United States Patent [19]
Cowan et al.

[11] Patent Number: 6,086,837
[45] Date of Patent: Jul. 11, 2000

[54] METHOD OF SYNTHESIZING ENRICHED DECABORANE FOR USE IN GENERATING BORON NEUTRON CAPTURE THERAPY PHARMACEUTICALS

[75] Inventors: Robert L. Cowan; Daniel M. Ginosar, both of Idaho Falls, Id.; Gary B. Dunks, Upland, Calif.

[73] Assignee: Bechtel BWXT Idaho, LLC, Idaho, Id.

[21] Appl. No.: 08/842,979

[22] Filed: Apr. 24, 1997

[51] Int. Cl.$^7$ ............................................. C01B 6/10
[52] U.S. Cl. .............................................................. 423/294
[58] Field of Search .............................................. 423/294

[56] References Cited

U.S. PATENT DOCUMENTS

| | | | |
|---|---|---|---|
| 3,169,044 | 2/1965 | Miller et al. | 423/294 |
| 4,115,520 | 9/1978 | Dunks et al. | 423/287 |
| 4,115,521 | 9/1978 | Dunks et al. | 423/294 |
| 4,153,672 | 5/1979 | Dunks et al. | 423/287 |

OTHER PUBLICATIONS

Schlesinger, H.I., et al., "Procedures for the Preparation of Methyl Borate", *J. Amer. Chem. Soc.,* 75, 213 (1953). (no month).

Schlesinger, H.I., et al., "The Preparation of Sodium Borohydride by the High Temperature Reaction of Sodium Hydride and Borate Esters", *J. Amer. Chem. Soc.,* 74, 205 (1953). (no month).

Fedor, W.S., et al., "Potassium Borohydride Manufacture", *Ind. Eng. Chem.,* 49 1664 (1957). (no month).

James. B.D., et al., "Metal Tetrahydroborates", *Prog. Inorg. Chem.,* 11, 99 (1981). (no month).

Dunks, G.B., et al., "Simplified synthesis of $B_{10}H_{14}$ from $NaBH_4$ via $B_{11}H_{14}$ Ion", *Inorg. Chem.,* 20, 1692 (1981). (no month).

Dunks, G.B., et al., "Decaborane(14)", *Inorg. Synthesis,* 22, 202 (1983). (no month).

Hawthorne, Prof. M. Frederick, UCLA Faculty Research Lecture, Internet http://www.bruin.ucla.edu/FRL/Hawthrone/page3.html. (no date).

*Primary Examiner*—Wayne Langel
*Attorney, Agent, or Firm*—Thorpe North & Western

[57] ABSTRACT

A method is described for synthesizing decaborane wherein at least about 90% of the boron atoms in the decaborane are the $^{10}B$ isotope, comprising the steps of: (a) reacting boric acid with a $C_1$ to $C_{10}$ alkanol to form a $^{10}B$-alkyl borate wherein at least about 90% of the boron atoms in the boric acid are the $^{10}B$ isotope; (b) reducing the $^{10}B$-alkyl borate to form an alkali metal $^{10}B$-borohydride; (c) converting the alkali metal $^{10}B$-borohydride to a $^{10}B$-tetradecahydroundecaborate ion; and (d) converting the $^{10}B$-tetradecahydroundecaborate ion to $^{10}B$-decaborane. Methods of preparing tetradecahydroundecaborate ions and decaborane from alkali metal borohydrides are also described.

25 Claims, No Drawings

METHOD OF SYNTHESIZING ENRICHED DECABORANE FOR USE IN GENERATING BORON NEUTRON CAPTURE THERAPY PHARMACEUTICALS

CONTRACTUAL ORIGIN OF THE INVENTION

The United States Government has rights in this invention pursuant to Contract No. DE-AC07-94ID13223 between Lockheed Martin Idaho Technologies Company and The United States Department of Energy.

BACKGROUND OF THE INVENTION

This invention relates to synthesis of decaborane. More particularly, the invention relates to an integrated process of synthesizing decaborane from boric acid such that at least about 90%, and preferably all, of the boron atoms in the decaborane molecule are the $^{10}B$ isotope.

Application of neutrons for radiotherapy of cancer has been a subject of considerable clinical and research interest since the discovery of the neutron by Chadwick in 1932. Fast neutron radiotherapy was first used by Robert Stone in the Lawrence Berkeley Laboratory in 1938. This technology has evolved over the years to the point where it is now a reimbursable modality of choice for treatment of inoperable salivary gland tumors, and it is emerging on the basis of recent research data as a promising alternate modality for treatment of prostate cancer, some lung tumors, and certain other malignancies as well. Neutron capture therapy (NCT), a somewhat different form of neutron-based therapy, was proposed in the mid 1930's and, despite some notable failures in early U.S. trials, has attracted a great deal of renewed research interest lately due to significant improvements in the relevant technology and radiobiological knowledge.

The basic physical processes involved in fast neutron therapy and neutron capture therapy differ in several respects. In fast neutron therapy, neutrons having relatively high energies (approximately 30–50 MeV) are generated by a suitable neutron source and used directly for irradiation of the "treatment volume," just as is done with standard photon (x-ray) therapy. In neutron capture therapy, a neutron capture agent, which in current practice is boron-10 (thus, boron neutron capture therapy or BNCT) is selectively taken into the malignant tissue following the administration of a suitable boronated pharmaceutical, preferably into the bloodstream of the patient. At an appropriate time after boron administration, the treatment volume is exposed to a field of thermal neutrons produced by application of an external neutron beam. The thermal neutrons interact with the boron-10 atoms, which have a very high capture cross section in the thermal energy range and, ideally, are present only in the malignant cells. Each boron-neutron interaction produces an alpha particle ($^4He^{2+}$) and a lithium ion ($^7Li^{3+}$) with about 2 MeV of kinetic energy distributed between these two heavy ion products. The translational range of these product ions is particularly short, about 7.6 $\mu$m in photographic gelatin and about 1.1 cm in air. Consequently, the lithium ion and the $\alpha$-particles are short-range, energetic species capable of imparting, through ionizing processes, immense local damage to organic materials, such as DNA, within a geometric volume that is comparable to the size a malignant cell. The $^{11}B$ nucleus is incapable of undergoing a boron neutron capture reaction, while the effective cross section of $^{10}B$ for boron neutron capture is 3837 barns ($10^{-24}$ cm$^2$). Ideally, cells that carry large numbers of $^{10}B$ nuclei are subject to destruction by BNC, while neighboring cells that are free of $^{10}B$ nuclei are spared.

Because boron is ideally taken up only in the malignant cells, the BNCT process offers the possibility of highly selective destruction of malignant tissue, with cellular-level separation of neighboring normal tissue since the neutron sources used for BNCT are themselves designed to produce a minimal level of damage of normal tissue. When BNCT is administered as a primary therapy, an epithermal-neutron beam (neutrons having energies in the range of 1 eV to 10 keV) is used to produce the required thermal neutron flux at depth, since these somewhat higher-energy neutrons will penetrate deeper into the irradiation volume before thermalizing, yet they are still not of sufficient energy to inflict unacceptable damage to intervening normal tissue.

A third form of neutron therapy, fast neutron therapy with neutron capture augmentation, is basically a hybrid that combines the features of fast neutron therapy and NCT. This procedure comprises introducing a neutron capture agent preferentially into the malignant tissue prior to the administration of standard fast neutron therapy. For example, B. R. Griffin & G. E. Laramore, WO 96/00113, showed that fast neutron therapy is significantly enhanced by irradiating target cells with fast neutrons in the presence of a boron neutron capture agent having preferably at least nine $^{10}B$ atoms per molecule of the agent. Suitable boron capture agents disclosed by WO 96/00112 include those based on: polyhedral borane anion derivatives, derivatives that comprise two polyhedral borane anion cages linked together to form a structure comprising 20 boron atoms, polyhedral carboranes such as compounds of the formulas closo-$C_2B_{n-2}H_n$, closo-$CB_{n-1}H_n^-$, or nido-$C_2B_{n-3}H_n^-$, oligomeric peptides constructed from boron-rich $\alpha$-amino acids, or boron enriched oligophosphates.

Decaborane, $B_{10}H_{14}$, due in part to its relative stability and its normally solid state, is one of the most useful of the boron hydrides. Moreover, decaborane is an essential precursor to many advanced pharmaceuticals useful in BNCT. Decaborane is, however, difficult to obtain commercially, explosive in combination with certain other compounds, and difficult to produce by known methods.

Prior to the late 1970's, the principal proposed processes for the preparation of decaborane involved pyrolytic or high pressure reactions using lower boron hydrides, such as diborane ($B_2H_6$) or tetraborane ($B_4H_{10}$). Processes of this type are disclosed in U.S. Pat. No. 2,987,377 to Faust et al.; U.S. Pat. No. 2,968,534 to G. F. Judd; and U.S. Pat. No. 2,989,374 to J. A. Neff. A non-pyrolytic method involving the reaction of an alkali metal pentaborane with diborane at temperatures below $-20°$ C. is disclosed in U.S. Pat. No. 3,489,517 to Shore et al. These methods all required elaborate equipment and potentially hazardous reagents.

U.S. Pat. No. 4,115,521 to G. B. Dunks et al. discloses an improved process wherein decaborane is prepared from a stable higher borohydride salt by a single step oxidation reaction using conventional oxidants at ambient room temperatures and ordinary atmospheric pressure and in ordinary chemical apparatus. This method consists of contacting and oxidizing the $B_{11}H_{14}^-$ anion at a temperature between $-10°$ C. and $50°$ C. with an oxidizing agent having an electrode potential ($E_o$) of at least +0.6 volts. U.S. Pat. No. 4,153,672 and U.S. Pat. No. 4,115,520 to G. B. Dunks et al. further discloses a method of synthesizing the $B_{11}H_{14}^-$ anion by heating a suspension of an alkali metal borohydride in a solvent and adding an alkyl halide. The Dunks patents do not teach methods for the production of $^{10}B$-enriched decaborane or its use as a precursor of BNCT pharmaceuticals, which require that at least about 90% of the boron atoms be $^{10}B$. Moreover, the Dunks patents also do not teach the conversion of $^{10}B(OH)_3$ to enriched decaborane via the precursors, $Na^{10}BH_4$ and the $Na^{10}B_{11}H_{14}$.

In view of the foregoing, it will be appreciated that providing an integrated process for synthesis of decaborane from boric acid such that all of the boron atoms are the $^{10}B$ isotope would be a significant advancement in the art. Additional advancements in the art are obtained by means of improved methods of synthesizing the $B_{11}H_{14}$ anion from an alkali metal borohydride, and converting the $B_{11}H_{14}$ anion to decaborane.

BRIEF SUMMARY OF THE INVENTION

It is an object of the present invention to provide an integrated process for synthesizing $^{10}B$-decaborane from readily available starting materials.

It is also an object of the invention to provide a method of synthesizing $^{10}B$-decaborane that avoids the potential for scrambling of the labeled material according to previous methods and that avoids undesirable side products that can interfere with the synthesis reactions.

It is another object of the invention to provide a method of synthesizing decaborane that avoids using a boron compound catalyst that leads to contamination of the product.

It is still another object of the invention to provide improved methods of converting an alkali metal borohydride to the $B_{11}H_{14}^-$ anion and converting the $B_{11}H_{14}^-$ anion to decaborane.

These and other objects can be achieved by providing a method for synthesizing decaborane wherein at least about 90%, and preferably substantially all, of the boron atoms in the decaborane are the $^{10}B$ isotope, comprising the steps of:

(a) reacting boric acid with a $C_1$ to $C_{10}$ alkanol to form a $^{10}B$-alkyl borate wherein at least about 90%, and preferably substantially all, of the boron atoms in the boric acid are the $^{10}B$ isotope;

(b) reducing the $^{10}B$-alkyl borate to form an alkali metal $^{10}B$-borohydride;

(c) converting the alkali metal $^{10}B$-borohydride to a $^{10}B$-tetradecahydroundecaborate ion; and (d) converting the $^{10}B$-tetradecahydroundecaborate ion to $^{10}B$-decaborane.

In one embodiment of this method, step (a) comprises mixing the $^{10}B$-boric acid and methanol to produce $^{10}B$-methyl borate, distilling an azeotropic mixture of $^{10}B$-methyl borate and methanol from the reaction mixture, and separating the $^{10}B$-methyl borate from the methanol. Preferably, the separation of the $^{10}B$-methyl borate from the methanol is carried out by freeze recrystallization of the $^{10}B$-methyl borate and decanting of the methanol.

In another embodiment of the method, step (b) comprises mixing the $^{10}B$-alkyl borate and an alkali metal hydride in an effective amount of mineral oil to form a mixture and heating at about 220° C. to 250° C. until the $^{10}B$-alkyl borate is reduced to the alkali metal $^{10}B$-borohydride. Preferably, the alkali metal hydride is sodium hydride. In one illustrative embodiment, this step further comprises quenching the reaction by mixing ice and water with the mixture to form a two-phase system comprising a mineral oil layer and an aqueous layer comprising methanol, sodium hydroxide, and sodium $^{10}B$-borohydride; separating the mineral oil layer from the aqueous layer to form a separated aqueous layer; purging the separated aqueous layer of methanol resulting in a mixture of sodium hydroxide and sodium $^{10}B$-borohydride; bubbling carbon dioxide gas through the mixture of sodium hydroxide and sodium $^{10}B$-borohydride to convert the sodium hydroxide to sodium carbonate, resulting in a slurry; treating the slurry with n-propylamine to extract the sodium $^{10}B$-borohydride; and isolating the sodium $^{10}B$-borohydride by filtration. The purging of methanol can be carried out by either heating to about 60° C. in a constant stream of nitrogen gas or gentle heating to about 60° C. under reduced pressure, such as by using a reduced pressure solvent removal apparatus.

In another embodiment of the method, step (c) comprises adding an alkyl halide and an iodine or bromine catalyst to a suspension of the alkali metal $^{10}B$-borohydride in a solvent and heating at a temperature of about 85° C. to about 135° C. Preferably, the alkyl halide is represented by the formula RX, wherein R represents an alkyl group of about 1 to 10 carbon atoms, and X represents chloride, bromide, or iodide. It is also preferred that the alkyl group is a straight chain, primary, monosubstituted alkyl group. Preferably, the iodine or bromine catalyst is a member selected from the group consisting of iodine, alkali metal iodides, ammonium iodide, bromine, alkali metal bromides, ammonium bromide, and mixtures thereof, and more preferably is sodium iodide. The solvent is preferably a member selected from the group consisting of glyme, diglyme, cyclic ethers, diethylcarbitol, tetrahydrofuran, and similar non-aqueous solvents wherein alkali metal borohydrides are highly soluble.

In another embodiment of the method, step (d) comprises contacting and oxidizing the $^{10}B$-tetradecahydroundecaborate ion at a temperature of about −10° C. to 50° C. with an oxidizing agent having an electrode potential of at least +0.6 volts. This reaction is carried out in a liquid medium that is substantially unreactive toward the oxidizing agent, the $^{10}B$-tetradecahydroundecaborate ion, and the $^{10}B$-decaborane molecule, and that facilitates contact of the $^{10}B$-tetradecahydroundecaborate ion with an oxidatively active moiety of the oxidizing agent. A preferred liquid medium comprises an acidified aqueous medium, such as one comprising ferrous ion and hydrogen peroxide; or a two-phase liquid medium comprising an acidified aqueous medium and a non-polar organic solvent, such as benzene, hexane, diethylether, or mixtures thereof.

A method for preparing a tetradecahydroundecaborate ion comprises contacting in an inert, non-aqueous solvent medium and at a temperature of from about 85° C. to about 135° C.:

(a) a tetrahydroborate having the formula $MBH_4$ wherein M represents an ion selected from the group consisting of sodium, potassium, lithium, cesium, rubidium, and lower alkyl ammonium;

(b) an alkyl halide of the formula $RX$ wherein R represents an alkyl group of from about 1 to about 10 carbon atoms and X represents chloride, bromide, or iodide; and (c) a catalyst selected from the group consisting of iodine, alkali metal iodides, ammonium iodide, bromine, alkali metal bromides, ammonium bromide, and mixtures thereof. Preferably, the alkyl halide is 1-chloropentane, and the catalyst is sodium iodide. Preferably, the tetradecahydroundecaborate ions are isolated from the reaction mixture by mixing with an effective amount of water to form an aqueous mixture, thereby precipitating the tetradecahydroundecaborate ions, and then separating the precipitated tetradecahydroundecaborate ions from the aqueous mixture.

A method for preparing decaborane comprises the steps of:

(a) contacting in an inert, non-aqueous solvent medium and at a temperature of from about 85° C. to about 135° C.:

(I) a tetrahydroborate having the formula

MBH$_4$ wherein M represents an ion selected from the group consisting of sodium, potassium, lithium, cesium, rubidium, and lower alkyl ammonium, (ii) an alkyl halide of the formula

RX wherein R represents an alkyl group of from about 1 to about 10 carbon atoms and X represents chloride, bromide, or iodide, and (iii) a catalyst selected from the group consisting of iodine, alkali metal iodides, ammonium iodide, bromine, alkali metal bromides, ammonium bromide, and mixtures thereof, resulting in formation of a mixture comprising tetradecahydroundecaborate ions;

(b) isolating the tetradecahydroundecaborate ions from the mixture; and (c) contacting and oxidizing the isolated tetradecahydroundecaborate ions at a temperature of about –10° C. to about 50° C. with an oxidizing agent having an electrode potential of at least +0.6 volts.

DETAILED DESCRIPTION OF THE INVENTION

Before the present process of synthesizing decaborane for use in generating BNCT pharmaceuticals is disclosed and described, it is to be understood that this invention is not limited to the particular configurations, process steps, and materials disclosed herein as such configurations, process steps, and materials may vary somewhat. It is also to be understood that the terminology employed herein is used for the purpose of describing particular embodiments only and is not intended to be limiting since the scope of the present invention will be limited only by the appended claims and equivalents thereof.

It must be noted that, as used in this specification and the appended claims, the singular forms "a," "an," and "the" include plural referents unless the context clearly dictates otherwise. Thus, for example, reference to "an alkyl halide" includes reference to a mixture of two or more such alkyl halides, reference to "an iodine or bromine catalyst" includes reference to one or more such catalysts, and reference to "a non-polar organic solvent" includes reference to a mixture of two or more such non-polar organic solvents.

In describing and claiming the present invention, the following terminology will be used in accordance with the definitions set out below.

As used herein, "glyme" is 1,2-dimethoxyethane, and "diglyme" is the dimethyl ether of diethylene glycol or bis(2-methoxyethyl) ether.

As used herein, an "effective amount" is an amount sufficient to provide a selected effect.

The steps involved in the presently described integrated process of synthesizing $^{10}$B-decaborane from $^{10}$B-boric acid are generally as follows: (a) conversion of boric acid to boric esters, (b) conversion of boric esters to borohydride, (3) conversion of borohydride to $B_{11}H_{14}^-$, and (4) conversion of $B_{11}H_{14}$ to decaborane.

Conversion of Boric Acid to Boric Esters

The alkyl ester of $^{10}$B-boric acid is prepared using a known reaction of an acid with an alcohol. The procedure comprises mixing $^{10}$B-boric acid with a selected alkanol, preferably a $C_1$ to $C_{10}$ alkanol, and then isolating the resulting boric ester. An especially preferred procedure comprises mixing $^{10}$B-boric acid with methanol (1:8 molar ratio), and then separating the resulting $^{10}$B-methyl borate by an azeotropic distillation procedure. This procedure requires careful monitoring of the distillation temperature to prevent distillation of unreacted methanol from the reaction mixture. The product is the azeotropic mixture of methanol and $^{10}$B-methyl borate. The pure borate ester is obtained by freeze recrystallization. The azeotrope is cooled to induce crystallization of the methyl borate. Preferably, this is done in a three one step procedures, for example one at –40° C., one at –36° C., and again at –36° C. The remaining liquid (methanol) is then decanted from the methyl borate. The yield of the purified product is typically about 80%.

EXAMPLE 1

In this example, 2.5 kg of $^{10}$B-boric acid and 13 liters of methanol were mixed in a 20 liter reactor and then subjected to an azeotropic distillation at 51–52° C. The product was the azeotropic mixture of methanol and $^{10}$B-methyl borate. The azeotrope was cooled on an acetonitrile/dry ice bath, and purified $^{10}$B-methyl borate was obtained by freeze recrystallization. The remaining methanol was then decanted to yield 2.8 kg of $^{10}$B-methyl borate.

Conversion of Boric Esters to Borohydride

The process for conversion of $^{10}$B-boric esters to $^{10}$B-borohydride involves a high temperature reaction of an alkali metal hydride, preferably sodium hydride, with an alkyl borate, preferably methyl borate. This process comprises mixing the alkyl borate with a suspension of alkali metal hydride in mineral oil at about 220–250° C. This chemical reaction is well-behaved and the borohydride is synthesized in reasonable yields. Isolation of the product, however, requires special attention in the areas of (a) quenching the reaction mixture to remove excess alkali metal hydride, (b) removing the mineral oil from the product, and (c) extracting the alkali metal borohydride.

Initial attempts to quench the reaction mixture using alcohols were successful. However, some attempts to quench the reaction with isopropanol or water, resulted in foaming problems. It is believed that the foaming may have been due to contamination of the reaction with sodium metal, which is more reactive than sodium hydride. The foaming problem was alleviated by pouring the reaction mixture into an excess of ice and water.

A second problem is the removal of mineral oil from the reaction product, e.g. sodium borohydride. If the solid material from the reaction is merely isolated by filtering, suspending in cyclohexane, and refiltering, a solid having reduced oil content consisting of 3 moles of sodium methoxide (using methyl borate as the borate ester and sodium hydride as the alkali metal hydride) per mole of sodium borohydride is obtained. The sodium methoxide is a fine material that easily clogs filtration equipment. Further, sodium methoxide readily absorbs moisture from the air to form a gummy material. The key to solving these problems is eliminating all handling of sodium methoxide. This is accomplished by quenching the reaction mixture with water and ice, as described above. This quenching step not only quenches any unreacted sodium hydride and sodium metal, but also results in conversion of sodium methoxide to sodium hydroxide and methanol. Normally, sodium borohydride is not stable in water. The presence of sodium hydroxide, however, greatly stabilizes solutions of sodium borohydride, even when heated. Thus, the reaction results in an aqueous solution of sodium hydroxide, sodium borohydride, and methanol. This liquid is easily separated from the mineral oil by decanting or with a separatory funnel. The aqueous solution is then treated to remove most of the methanol.

It was originally contemplated that sodium borohydride would be extracted from sodium methoxide with n-propylamine, which is fairly selective for sodium borohydride. N-propylamine, however, does not extract the borohydride from the aqueous reaction mixture. Moreover, methanol and n-propylamine are difficult to separate by distillation. Since large amounts of n-propylamine are used to extract sodium borohydride, an efficient method of recycling the n-propylamine was desired. The aqueous solutions were purged of methanol by either (a) gentle heating to about 60° C. with a constant purge of nitrogen, or (b) by gentle heating under reduced pressure using a reduced pressure solvent removal apparatus (such as a rotary evaporator). This left an aqueous solution of sodium hydroxide and sodium borohydride. Treatment of this solution with carbon dioxide converted the sodium hydroxide to sodium carbonate, which took up the water to form a solid mass. The resulting slurry was then treated with n-propylamine to extract the sodium borohydride, which was easily isolated by filtration.

EXAMPLE 2

In this example, 1380 g of $^{10}$B-methyl borate prepared according to the procedure of Example 1 and 2000 g of sodium hydride 60% dispersion in oil were mixed in 3,600 ml of mineral oil and heated to 220–250° C. for 12 hours. Following completion of the reaction, the cooled reaction mixture was poured into a large vessel containing about 4 liters of ice and water. The aqueous layer was then separated from the mineral oil by decanting and/or with a separatory funnel. The aqueous solution was purged of methanol by either (a) gentle heating to about 60° C. with a constant purge of nitrogen, or (b) by gentle heating using a reduced pressure solvent removal apparatus. The resulting aqueous solution comprised a mixture of sodium hydroxide and sodium $^{10}$B-borohydride. Carbon dioxide gas was bubbled through the solution to convert the sodium hydroxide to sodium carbonate. The resulting slurry was then treated with n-propylamine to extract the sodium $^{10}$B-borohydride, which was easily isolated by filtration. Evaporation of the amine solvent gave typical yields of about 45–65%.
Conversion of Borohydride to $B_{11}H_{14}^-$ $^{10}$B-borohydride is converted to the $^{10}B_{11}H_{14}^-$ anion by heating a suspension of the borohydride ion in a solvent at a temperature of about 85° C. to about 135° C., preferably about 90° C.–100° C., and adding an alkyl halide and iodine or bromine as a catalyst. The borohydride is provided as a metal borohydride having the formula $MBH_4$, wherein M represents an ion selected from the group consisting of sodium, potassium, lithium, cesium, rubidium, or lower alkyl-ammonium. Sodium borohydride is preferred. The alkyl halide is represented by the formula RX, wherein R represents an alkyl group of about 1 to 10 carbon atoms, and X represents chloride, bromide, or iodide. The alkyl group is preferably straight rather than branched, and is preferably a primary alkyl group rather than a secondary, cycloalkyl, or tertiary alkyl group. Monosubstituted alkyl halides are preferred over disubstituted alkyl halides. The iodine or bromine catalyst can be in the form of an elemental halide, an alkali metal salt, or ammonium salt. The solvent should dissolve enough borohydride ion so that the reaction occurs at a practical rate, should dissolve sufficient alkyl halide for the reaction to occur, and should be dry and unreactive to the borohydride ion. Further, the solvent should have a boiling point of at least about 120° C. so that the reaction can occur in the appropriate temperature range. Preferred solvents include diglyme, the diethyl ether of diethylene glycol, and similar ethers.

The $^{10}B_{11}H_{14}^-$ is preferably isolated by pouring the reaction mixture into a large excess of water and then adjusting the pH to obtain an acidic solution. About 90% of the $^{10}B_{11}H_{14}^-$ precipitates as a solid. This method of isolation results in higher purity and better yield than have been obtained by other methods, both of which are advantageous for the succeeding step of converting the $^{10}B_{11}H_{14}^-$ to $^{10}$B-decaborane.

EXAMPLE 3

A 12 liter, 3-neck round bottom flask was cleaned, dried, and then placed into a heating mantle. The flask was equipped with a thermometer adapter fitted with a thermometer and a gas fitting, to which an argon purge line was attached. An overhead stirrer was also attached to the flask, and a y-shaped adapter was attached to the third neck of the flask. A liquid addition funnel (1 L) was attached to one leg of the y-adapter, and a water-cooled cold finger was attached to the other leg of the y-adapter and was placed in a position to cool the exiting gas stream such that any condensation would run back into the reaction flask. The exiting gas stream was run into a large bubbler containing acetone (this was for safety reasons to destroy any diborane present in the gas stream). The condenser caught any unreacted 1-chloropentane and returned it to the reaction flask and cooled the exiting gas stream to prevent heating of the acetone trap.

The whole apparatus was flushed with argon, and then 3600 mL of anhydrous diglyme, 720 g of sodium $^{10}$B-borohydride prepared according to the procedure of Example 2, and 50 g of sodium iodide were added sequentially to the flask. This mixture was heated then maintained at 100° C. with stirring and constant purging with argon. The addition funnel was charged with 1-chloropentane, and then the 1-chloropentane was added to the reaction mixture at the rate of approximately 200 mL/hr until 2,100 mL were added. The addition of 1-chloropentane caused evolution of hydrogen gas and required constant monitoring of the reaction temperature. Temperatures of less than 110° C. were generally maintained, but temperatures as high as 125° C. have occurred without any damage to the reaction. Once addition of 1-chloropentane was started, the argon purge was discontinued. Once the addition of 1-chloropentane was completed, the reaction mixture was heated overnight, and a gentle argon purge was restored to maintain a positive inert atmosphere. The reaction was checked for completion using $^{10}$B NMR in alkaline $D_2O$. Upon completion, the reaction mixture was allowed to cool with constant stirring. Next, water (1 L) was slowly added to the reaction mixture with stirring, resulting in evolution of hydrogen gas. Water was added until no more gas evolved.

The reaction mixture was then poured into 10 liters of water with stirring. Then, 1 liter of orthophosphoric acid (85%) was slowly added to the reaction mixture, resulting in the evolution of additional hydrogen gas. More water was then added until the total volume was approximately 19 liters. When necessary, the reaction mixture was allowed to cool to room temperature.

The solid material ($^{10}B—B_{11}H_{14}^-$) from the reaction mixture was then collected by vacuum filtration using a coarse glass frit. The solid was not washed, but was dried as completely as possible on the frit. The solid was then weighed.

Conversion of $B_{11}H_{14}^-$ to Decaborane

The $^{10}B_{11}H_{14}^-$ anion is converted to $^{10}B$-decaborane by chemical oxidation, generally according to the method described in U.S. Pat. No. 4,115,521, hereby incorporated by reference. The method comprises contacting and oxidizing the $B_{11}H_{14}^-$ ion at a temperature of about $-10°$ C. to $50°$ C. with an oxidizing agent having an electrode potential of at least +0.6 volts. Acceptable oxidizing agents include sodium permanganate, potassium permanganate, potassium dichromate, chromic acid, oxalic acid, peracetic acid, perbenzoic acid, benzoyl peroxide, hydrogen peroxide, and certain aqueous acid solutions. The oxidation of the $B_{11}H_{14}$ ion must be carried out in a liquid medium that is substantially unreactive toward the oxidants and the boron-containing reagents and products, and that facilitates contact of the $B_{11}H_{14}^-$ ion with the oxidatively active moiety of the oxidation agent. In most cases, both the $B_{11}H_{14}^-$ ion source and the oxidant are mutually soluble in an acidified aqueous medium, and accordingly such media are preferred. Since the decaborane product, however, is only slightly soluble in water and is extensively soluble in non-polar organic media such as benzene, hexane, cyclohexane, toluene, diethylether, and the like, isolation of decaborane is greatly facilitated by the addition of one of these solvents to the reaction mixture to establish a two-phase liquid medium.

EXAMPLE 4

A weighed amount of $^{10}B—B_{11}H_{14}^-$ prepared according to the procedure of Example was placed into a 12 L three-neck flask equipped as described above except that the bubbler was filled with mineral oil. The flask was then placed on an ice bath and maintained at $35°$ C. or less. Water (2.2 mL per 1.0 g of solid) and hexane(s) (3.5 L) were then added sequentially to the flask. Sulfuric acid (50% aqueous solution, 840 mL) was then added slowly to the reaction flask. Next, ferrous sulfate heptahydrate (58 g) was added to the reaction mixture, and then hydrogen peroxide (30%, 1.1 mL per 1.0 g of solid) was slowly added to the reaction flask such that the temperature at $35°$ C. or less was maintained. Vigorous hydrogen gas evolution resulted. After the peroxide addition was completed, the reaction was allowed to cool to ambient temperature. The reaction mixture was then filtered and the hexane layer was separated. The hexane layer was washed with five 500-mL fractions of water, and was then pre-dried using anhydrous magnesium sulfate. The hexane solution was then passed through a column of activated silica gel to remove residual water and yellow-colored impurities. The resulting hexane solution containing $^{10}B$-decaborane was stable for shipment "as is" or for use in the synthesis of BNCT pharmaceuticals.

We claim:

1. A method for preparing a tetradecahydroundecaborate ion comprising contacting in an inert, non-aqueous solvent medium and at a temperature of from about $85°$ C. to about $135°$ C.:

(a) a tetrahydroborate having the formula $MBH_4$ wherein M represents an ion selected from the group consisting of sodium, potassium, lithium, cesium, rubidium, and lower alkyl ammonium;

(b) an alkyl halide of the formula

RX wherein R represents an alkyl group of from 1 to about 10 carbon atoms and X represents chloride, bromide, or iodide; and (c) a catalyst selected from the group consisting of iodine, alkali metal iodides, ammonium iodide, bromine, alkali metal bromides, ammonium bromide, and mixtures thereof;

with the proviso that an additional amount of said catalyst is added to said inert, non-aqueous solvent medium over and above any of said catalyst that is formed in situ during said contacting process.

2. The method of claim 1 wherein said tetrahydroborate is sodium borohydride.

3. The method of claim 2 wherein said sodium borohydride is sodium $^{10}B$-borohydride and said tetradecahydroundecaborate ion is $^{10}B$-tetradecahydroundecaborate ion.

4. The method of claim 1 wherein said alkyl group is a straight chain alkyl group and is a primary alkyl group.

5. The method of claim 4 wherein said alkyl halide is a monosubstituted alkyl halide group.

6. The method of claim 5 wherein said alkyl halide is 1-chloropentane.

7. The method of claim 1 wherein said catalyst is sodium iodide.

8. The method of claim 1 wherein said inert, non-aqueous solvent is a member selected from the group consisting of glyme, diglyme, cyclic ethers, diethylcarbitol, and tetrahydrofuran, and mixtures thereof.

9. The method of claim 1 wherein said contacting forms a mixture, said method further comprising isolating said tetradecahydroundecaborate ion by mixing said mixture with an effective amount of water to form an aqueous mixture, thereby precipitating said tetradecahydroundecaborate ion, and separating said precipitated tetradecahydroundecaborate from said aqueous mixture.

10. A method of preparing decaborane comprising the steps of:

(a) contacting in an inert, non-aqueous solvent medium and at a temperature of from about $85°$ C. to about $135°$ C.:

(i) a tetrahydroborate having the formula $MBH_4$ wherein M represents an ion selected from the group consisting of sodium, potassium, lithium, cesium, rubidium, and lower alkyl ammonium, (ii) an alkyl halide of the formula

RX wherein R represents an alkyl group of from 1 to about 10 carbon atoms and X represents chloride, bromide, or iodide, and (iii) a catalyst selected from the group consisting of iodine, alkali metal iodides, ammonium iodide, bromine, alkali metal bromides, ammonium bromide, and mixtures thereof, resulting in formation of a mixture comprising tetradecahydroundecaborate ions, with the proviso that an additional amount of said catalyst is added to said inert, non-aqueous solvent medium over and above any of said catalyst that is formed in situ during said contacting process;

(b) isolating said tetradecahydroundecaborate ions from said mixture; and (c) contacting and oxidizing said isolated tetradecahydroundecaborate ions at a temperature of about −10° C. to about 50° C. with an oxidizing agent having an electrode potential of at least +0.6 volts.

11. The method of claim 10 wherein said tetrahydroborate is sodium borohydride.

12. The method of claim 11 wherein said sodium borohydride is sodium $^{10}$B-borohydride and said decaborane is $^{10}$B-decaborane.

13. The method of claim 10 wherein said alkyl group is a straight chain alkyl group and is a primary alkyl group.

14. The method of claim 13 wherein said alkyl halide is a monosubstituted alkyl halide group.

15. The method of claim 14 wherein said alkyl halide is 1-chloropentane.

16. The method of claim 10 wherein said catalyst is sodium iodide.

17. The method of claim 10 wherein said inert, non-aqueous solvent is a member selected from the group consisting of glyme, diglyme, cyclic ethers, diethylcarbitol, and tetrahydrofuran, and mixtures thereof.

18. The method of claim 10 wherein said isolating said tetradecahydroundecaborate ions comprises mixing said mixture with an effective amount of water to form an aqueous mixture, thereby precipitating said tetradecahydroundecaborate ion, and separating said precipitated tetradecahydroundecaborate from said aqueous mixture.

19. The method of claim 10 wherein said contacting and oxidizing is carried out in a liquid medium that is substantially unreactive toward said oxidizing agent and said tetradecahydroundecaborate ion and said decaborane, and that facilitates contact of said tetradecahydroundecaborate ion with an oxidatively active moiety of said oxidizing agent.

20. The method of claim 19 wherein said liquid medium comprises an acidified aqueous medium.

21. The method of claim 20 wherein said acidified aqueous medium comprises ferrous ions and hydrogen peroxide.

22. The method of claim 20 wherein said liquid medium is a two-phase liquid medium further comprising a non-polar organic solvent.

23. The method of claim 22 wherein said non-polar organic solvent is a member selected from the group consisting of benzene, hexane, diethylether, and mixtures thereof.

24. A method for preparing a tetradecahydroundecaborate ion comprising:

(a) suspending in an inert, non-aqueous solvent medium and at a temperature of from about 85° C. to about 135° C. a tetrahydroborate having the formula $$MBH_4$$

wherein M represents an ion selected from the group consisting of sodium, potassium, lithium, cesium, rubidium, and lower alkyl ammonium forming a suspension;

(b) adding to said suspension
(i) an alkyl halide of the formula $$RX$$

wherein R represents an alkyl group of from 1 to about 10 carbon atoms and X represents chloride, bromide, or iodide; and (ii) a catalyst selected from the group consisting of iodine, alkali metal iodides, ammonium iodide, bromine, alkali metal bromides, ammonium bromide, and mixtures thereof, such that said tetrahydroborate, said alkyl halide, and said catalyst come into contact thereby forming a tetradecahydroundecaborate ion.

25. A method of preparing decaborane comprising the steps of:

(a) suspending in an inert, non-aqueous solvent medium and at a temperature of from about 85° C. to about 135° C. a tetrahydroborate having the formula $$MBH_4$$

wherein M represents an ion selected from the group consisting of sodium, potassium, lithium, cesium, rubidium, and lower alkyl ammonium forming a suspension, (b) adding to said suspension
(i) an alkyl halide of the formula $$RX$$

wherein R represents an alkyl group of from 1 to about 10 carbon atoms and X represents chloride, bromide, or iodide, and (ii) a catalyst selected from the group consisting of iodine, alkali metal iodides, ammonium iodide, bromine, alkali metal bromides, ammonium bromide, and mixtures thereof, such that said tetrahydroborate, said alkyl halide, and said catalyst come into contact forming a mixture comprising tetradecahydroundecaborate ions;

(c) isolating said tetradecahydroundecaborate ions from said mixture; and (d) contacting and oxidizing said isolated tetradecahydroundecaborate ions at a temperature of about −10° C. to about 50° C. with an oxidizing agent having an electrode potential of at least +0.6 volts.

* * * * *